United States Patent
Chen et al.

(10) Patent No.: US 9,142,225 B1
(45) Date of Patent: Sep. 22, 2015

(54) ELECTRONIC SYSTEM WITH ACTUATOR CONTROL MECHANISM AND METHOD OF OPERATION THEREOF

(71) Applicant: Western Digital Technologies, Inc., Irvine, CA (US)

(72) Inventors: Min Chen, San Jose, CA (US); Alexander Babinski, Laguna Niguel, CA (US); Yanan Huang, Torrance, CA (US); Young-Hoon Kim, Cupertino, CA (US); Duc T. Phan, Saratoga, CA (US); Jifang Tian, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/308,373

(22) Filed: Jun. 18, 2014

Related U.S. Application Data

(60) Provisional application No. 61/968,964, filed on Mar. 21, 2014.

(51) Int. Cl.
*G11B 5/09* (2006.01)
*G11B 5/55* (2006.01)

(52) U.S. Cl.
CPC ............... *G11B 5/09* (2013.01); *G11B 5/5539* (2013.01)

(58) Field of Classification Search
None
See application file for complete search history.

(56) References Cited

U.S. PATENT DOCUMENTS

| | | | |
|---|---|---|---|
| 5,675,558 A | * | 10/1997 | Katoh ..................... 369/30.15 |
| 5,696,647 A | * | 12/1997 | Phan et al. ............... 360/78.07 |
| 6,014,283 A | | 1/2000 | Codilian et al. |
| 6,052,076 A | | 4/2000 | Patton, III et al. |
| 6,052,250 A | | 4/2000 | Golowka et al. |
| 6,067,206 A | | 5/2000 | Hull et al. |
| 6,078,453 A | | 6/2000 | Dziallo et al. |
| 6,091,564 A | | 7/2000 | Codilian et al. |
| 6,094,020 A | | 7/2000 | Goretzki et al. |
| 6,101,065 A | | 8/2000 | Alfred et al. |
| 6,104,153 A | | 8/2000 | Codilian et al. |
| 6,122,133 A | | 9/2000 | Nazarian et al. |
| 6,122,135 A | | 9/2000 | Stich |
| 6,141,175 A | | 10/2000 | Nazarian et al. |
| 6,160,368 A | | 12/2000 | Plutowski |
| 6,181,502 B1 | | 1/2001 | Hussein et al. |
| 6,195,222 B1 | | 2/2001 | Heminger et al. |
| 6,198,584 B1 | | 3/2001 | Codilian et al. |
| 6,198,590 B1 | | 3/2001 | Codilian et al. |
| 6,204,988 B1 | | 3/2001 | Codilian et al. |
| 6,243,223 B1 | | 6/2001 | Elliott et al. |
| 6,281,652 B1 | | 8/2001 | Ryan et al. |
| 6,285,521 B1 | | 9/2001 | Hussein |
| 6,292,320 B1 | | 9/2001 | Mason et al. |
| 6,310,742 B1 | | 10/2001 | Nazarian et al. |
| 6,320,718 B1 | | 11/2001 | Bouwkamp et al. |
| 6,342,984 B1 | | 1/2002 | Hussein et al. |
| 6,347,018 B1 | | 2/2002 | Kadlec et al. |
| 6,369,972 B1 | | 4/2002 | Codilian et al. |
| 6,369,974 B1 | | 4/2002 | Asgari et al. |
| 6,462,896 B1 | | 10/2002 | Codilian et al. |

(Continued)

OTHER PUBLICATIONS

Minghui Zheng, et al., U.S. Appl. No. 14/335,653, filed Jul. 18, 2014, 12 pages.

*Primary Examiner* — Peter Vincent Agustin

(57) ABSTRACT

An apparatus includes: a media; a head over the media; a primary-actuator coupled to the head; and control circuitry, coupled to the primary-actuator and a secondary-actuator, configured to limit a secondary-actuator slew rate.

22 Claims, 6 Drawing Sheets

(56) References Cited

U.S. PATENT DOCUMENTS

| | | | |
|---|---|---|---|
| 6,465,981 B2 | 10/2002 | Zhang et al. |
| 6,476,996 B1 | 11/2002 | Ryan |
| 6,484,577 B1 | 11/2002 | Bennett |
| 6,490,119 B1 | 12/2002 | Mittal et al. |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,624,964 B1 * | 9/2003 | Pirzadeh .................. 360/78.07 |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,836 B2 | 6/2004 | Stevens et al. |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,038,876 B2 | 5/2006 | Morris |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,173,790 B2 | 2/2007 | Kobayashi et al. |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al. |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett et al. |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |

(56) References Cited

U.S. PATENT DOCUMENTS

| | | |
|---|---|---|
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,264,933 B1 * | 9/2012 | Oberg et al. ............... 369/59.25 |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 2006/0039079 A1 * | 2/2006 | Kobayashi et al. ......... 360/78.05 |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

* cited by examiner

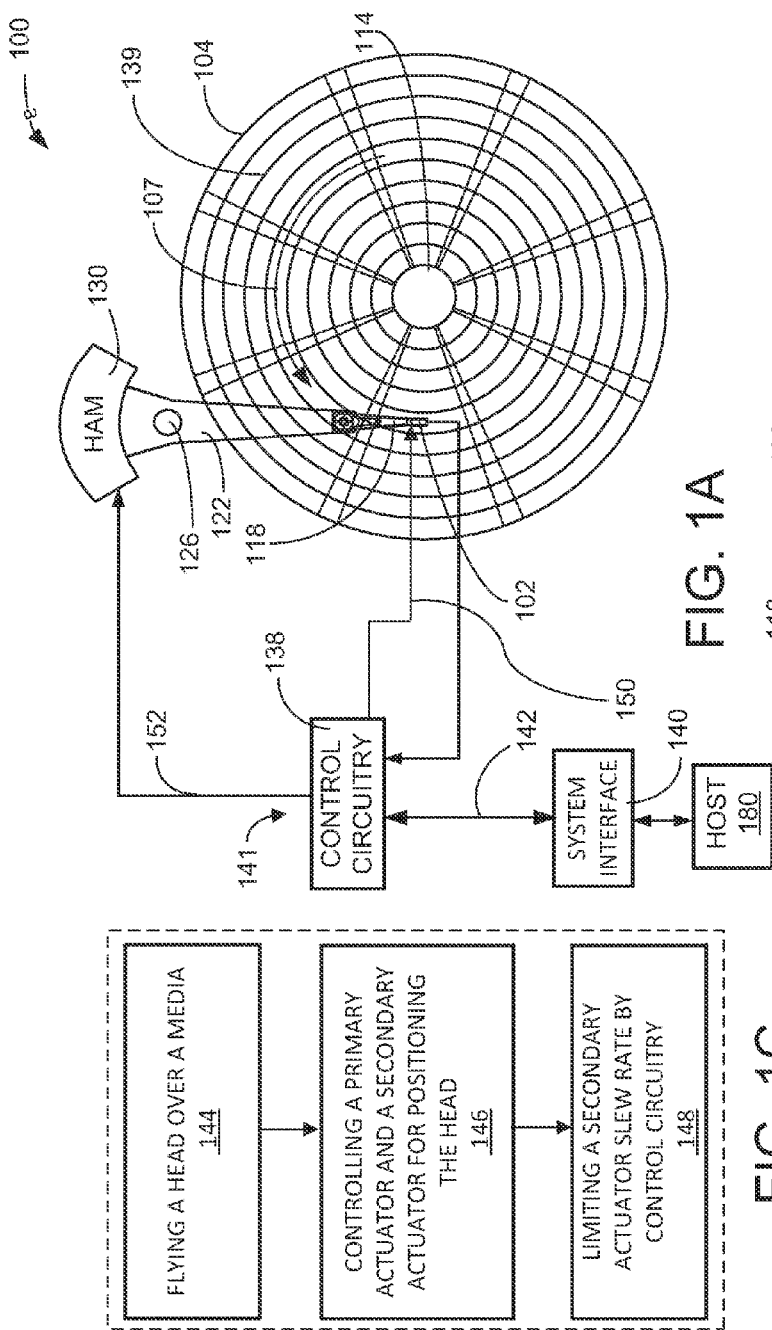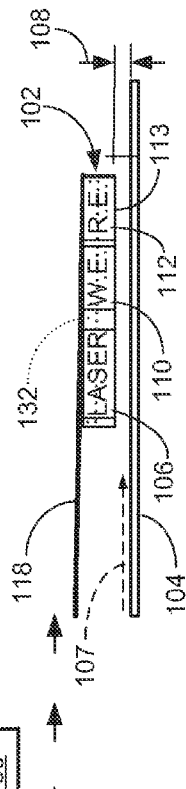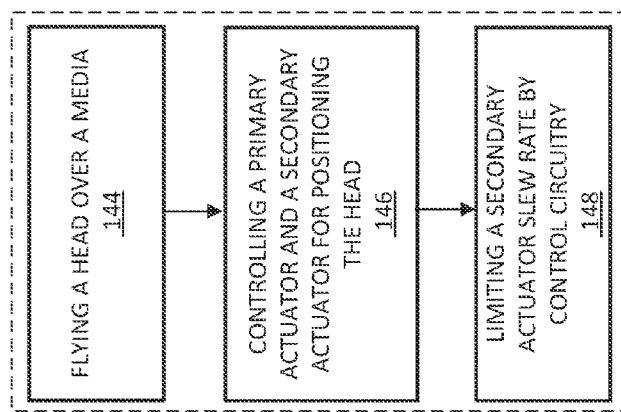

ELECTRONIC SYSTEM WITH ACTUATOR CONTROL MECHANISM AND METHOD OF OPERATION THEREOF

CROSS-REFERENCE TO RELATED APPLICATION(S)

This application claims the benefit of U.S. Provisional Patent Application Ser. No. 61/968,964 filed Mar. 21, 2014, and the subject matter thereof is incorporated herein by reference thereto.

TECHNICAL FIELD

An embodiment relates generally to an electronic system, and more particularly to a system for actuator control.

BACKGROUND

Modern consumer and industrial electronic devices require storage of information, such as digital photographs, electronic mail, calendar, or contacts. These devices can be electronic systems, such as notebook computers, desktop computers, servers, televisions, and projectors, and are providing increasing levels of functionality to support modern life. Increased capacity and cost reductions are an ongoing market demand for storage in these systems.

Research and development in the existing technologies can take a myriad of different directions. One way to increase performance and reduce cost at the same time is to provide reliable products with higher density for storage.

BRIEF DESCRIPTION OF THE DRAWINGS

FIGS. 1A, 1B, and 1C show an operational diagram of an electronic system according to one embodiment.

DETAILED DESCRIPTION

Figure 2:
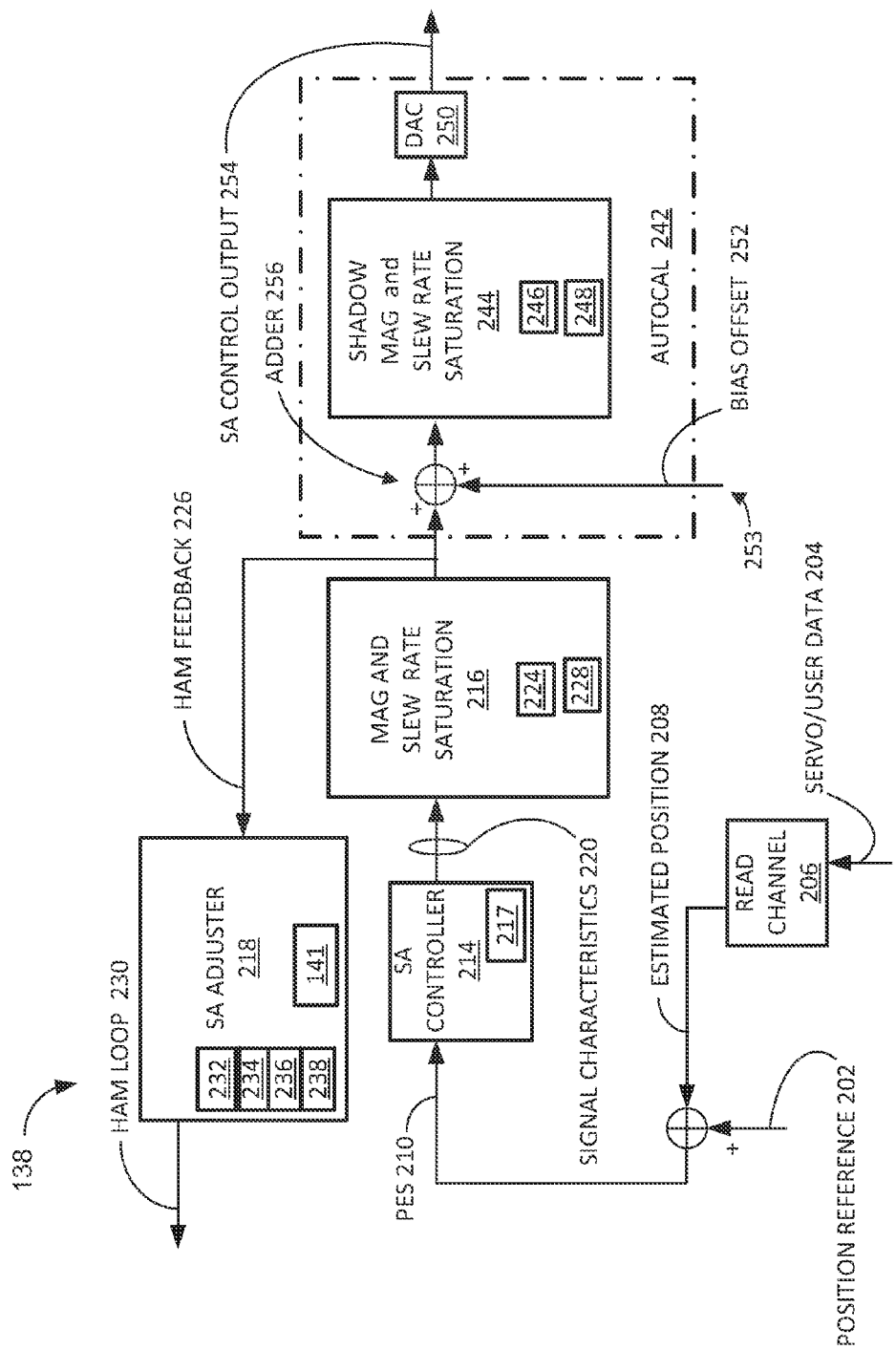
FIG. 2 shows block functions of portions of the control circuitry detailing adjustment calculations used for controlling the secondary-actuator according to one embodiment.

A need still remains for an electronic system with media recovery mechanism for improving yield and performance when writing. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

Certain embodiments have other steps or elements in addition to or in place of those mentioned above. The steps or elements will become apparent to those skilled in the art from a reading of the following detailed description when taken with reference to the accompanying drawings.

The following embodiments are described in sufficient detail to enable those skilled in the art to make and use the embodiments. It is to be understood that other embodiments would be evident based on the present disclosure, and that system, process, or mechanical changes may be made without departing from the scope of an embodiment.

In the following description, numerous specific details are given to provide a thorough understanding of the embodiments. However, it will be apparent that the embodiments can be practiced without these specific details. In order to avoid obscuring an embodiment, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, an embodiment can be operated in any orientation. For reference purposes a data surface of the media is defined as being "horizontal" though it is understood that the electronic system can operate at any angle. Position of the head over the media is referred to as a "vertical" displacement or flying height.

Referring now to FIGS. 1A, 1B, and 1C, therein are shown an operational diagram of an electronic system 100 according to one embodiment. The electronic system 100 can represent an apparatus for the various embodiments. An embodiment depicted in FIGS. 1A, 1B, and 1C is shown as a hard disk drive, as an example, although it is understood that the electronic system 100 of the various embodiments can be a tape drive, a solid-state hybrid disk drive, or other magnetic media-based storage device. Further for example, the electronic system 100 can represent a desktop computer, a notebook computer, a server, a tablet, a television, a household appliance, or other electronic systems utilizing magnetic media storage.

In one embodiment, the electronic system 100 comprises a head 102 actuated over a media 104. The head 102 can be mounted to a flex arm 118 attached to a primary-actuator 122. The head 102 (as shown in FIG. 1B) can optionally include a laser 106 for heating the media 104 during part of a write process (e.g., the head is part of an Energy-Assisted Magnetic Recording (EAMR) drive). Flying height 108 can be adjusted (e.g., by use of a heater element in the head not shown in FIG. 1B) while writing data to the media 104 or as an error recovery process during reading from the media 104. Also in an embodiment of FIG. 1B, the head 102 comprises a write element 110 (e.g., an inductive coil) and a read element 112 (e.g., a magneto-resistive read element) and a head active surface 113 of the head 102. The head active surface 113 of the head 102 directly faces the data surface of the media 104 as depicted in FIG. 1B.

The media 104 is a structure for storing information. For example, the media 104 can be made of an aluminum alloy, ceramic/glass, or a similar non-magnetic material. The top and bottom surfaces of the media 104 can be covered with magnetic material deposited on one or both sides of the media 104 to form a coating layer capable of magnetization. As an example, the media 104 can be a disk platter for one embodiment of the electronic system 100 as a rotating storage system, such as a hard disk drive (HDD). As a further example, the media 104 can be a linear magnetic strip for one embodiment of the electronic system 100 as a linear storage system, such as a tape drive.

The laser 106, as an example, can be a laser diode or other solid-state based lasers. In addition, embodiments can employ any suitable techniques for focusing the laser 106 on the media 104, such as a suitable waveguide, magnifying lens, or other suitable optics. The laser 106 is increased to a write power in order to heat the disk, thereby decreasing the coercivity of the media 104 so that the data is written more reliably.

A spindle motor 114 can rotate the media 104, about a center of the media 104, at a constant or varying a speed 107. For illustrative purposes, the spindle motor 114 is described as a motor for a rotation, although it is understood that the spindle motor 114 can be other actuating motors for a tape drive, as an example.

As examples, a head actuator motor (HAM) 130 can be a voice coil motor assembly, a stepper motor assembly, or a combination thereof. The HAM 130 can generate a torque or force for positioning the head 102.

A tapered end of the flex arm 118 can include the head 102 attached to the flex arm 118 by a secondary-actuator 132 shown hidden with dotted lines in FIG. 1B. The secondary-actuator 132 can include, for example, a slider manipulator such as a piezoelectric transducer device, a micro-electromechanical system (MEMS) device, a temperature or electrically controlled bi-laminate device, or a device capable of adjusting the position of the head 102 relative to a data surface of the media 104 facing the head 102.

The flex arm 118, attached to the primary-actuator 122, is pivoted around a bearing assembly 126 by torque generated by the HAM 130. The head 102 can include a single instance of the write element 110 and a single instance of the read element 112 that is narrower than the write element 110. The head 102 can fly over the media 104 at a dynamically adjustable span of the flying height 108, which represents a vertical displacement between the head 102 and the media 104.

The head 102 can be positioned by the primary-actuator 122 and the secondary-actuator 132 between the head 102 and the flex arm 118. The flying height 108 of the head 102 can be adjusted with the secondary-actuator 132 by control circuitry 138. The head 102 can be positioned, over the media 104, along an arc shaped path between an inner diameter of the media 104 and an outer diameter of the media 104.

For illustrative purposes, the primary-actuator 122 and the HAM 130 are configured for rotary movement of the head 102. The primary-actuator 122 and the HAM 130 can be configured to have a different movement. For example, the primary-actuator 122 and the HAM 130 could be configured to have a linear movement resulting in the head 102 traveling along a radius of the media 104.

The head 102 can be positioned over the media 104 to create magnetic transitions or detect magnetic transitions from the coating layer that can be used to represent written data or read data, respectively. The position of the head 102 and the speed 107 of the media 104 can be controlled by the control circuitry 138.

Examples of the control circuitry 138 can include a processor, an application specific integrated circuit (ASIC), an embedded processor, a microprocessor, a hardware control logic, a hardware finite state machine (FSM), a digital signal processor (DSP), digital circuitry, analog circuitry, optical circuitry, or a combination thereof. The control circuitry 138 can also include memory devices, such as a volatile memory, a nonvolatile memory, or a combination thereof. For example, the nonvolatile storage can be nonvolatile random access memory (NVRAM) or Flash memory and a volatile storage can be static random access memory (SRAM) or dynamic random access memory (DRAM).

A system interface 140 can couple the control circuitry 138 to a host electronics (not shown) of a host 180. The system interface 140 can transfer user data 142 between the host electronics and the control circuitry 138. The user data 142 can be encoded or decoded by the control circuitry 138 in preparation for transfer to or from the media 104.

The control circuitry 138 can be configured to control the spindle motor 114 using a spindle motor interface (not shown) for adjusting the speed 107 of the media 104. The control circuitry 138 can be configured to cause the head 102 to move relative to the media 104, or vice versa. The control circuitry 138 can also be configured to control the flow of information to the head 102 for writing to the media 104. The information sent to the head 102 can include a preconditioning pattern, a direct current erase signals, user data, or a combination thereof.

In an embodiment, Head Disk Interaction (HDI) becomes increasingly important issue for the hard disk drives. One of the causes for an HDI is from the actuator control activity, especially for the secondary-actuator 132. Fast and large PZT control voltage change could cause large vertical motion of the head 102 and even trigger the sustained head vibration. In an embodiment, limiting a slew rates of signals used to control the secondary-actuator 132 can prevent large and rapid control output changes.

The secondary-actuator 132, such as piezoelectric transducer (PZT) actuator for adjusting the head 102, can be used to provide sub-micro or sub-millimeter head positioning of the head 102 relative to the data surface of the media 104 for maximum signal-to-noise ratios with normal drive operations, such as reading or writing of the media 104. The secondary-actuator 132 can be a micro-actuator, a milli-actuator, or any combination thereof.

The secondary-actuator 132 can be coupled or connected with the control circuitry 138 by a secondary-actuator control interface 150. The secondary-actuator control interface 150 of various embodiments can include sa_control signals consisting of analog, digital, or a combination of signal types thereof. The secondary-actuator 132 can control fine lateral movement of the head 102, resulting in a raising or lowering of the head 102 flying over the media 104.

In various embodiments, the control circuitry 138 can be performing calculations used to configure or control the head 102. In various embodiments, the head 102 can be raised, lowered, moved laterally, or a combination thereof by the control circuitry 138 using the secondary-actuator control interface 150. The control circuitry 138 calculates secondary-actuator controls 141 or signals that can be used for controlling lateral head movement or configuring the flying positioning of the head 102 to within a localized range 139 on the media, thus enabling the control circuitry 138 to compensate or correct movement of the head active surface 113 of the head 102 from any out of plane motion, a HDI event, or a combination thereof. The localized range 139 can be a data track on the media 104, for example.

The term out of plane motion is defined as a movement of an element, such as the head active surface 113, from or out of an area formed by an existing desired or intended plane of movement. For example, the head active surface 113 of the head 102 flying in a plane parallel to the data surface of the media is considered to be out of plane motion if the head momentarily exits any area within the plane parallel to the data surface.

The out of plane motion of the head active surface 113 can be attributed to unintended movements such as lift, pitch, roll, yaw about an axis not perpendicular to the data surface of the media 104, vibration, shock, dip, variations in the speed 107 of the spindle motor 114, or any combination thereof of the head active surface 113 directly facing the data surface of the media. Additional details related to out of plane motion will be provided below in FIG. 5 and further details related to the flow diagram will be provided below in conjunction with the FIG. 2 and with other embodiments.

Examples of forces or factors generating the unintended movements can include impacts, temperature changes, pressure changes, internal or external power fluctuations, rotational movements, circuitry aging, circuitry re-calibrations or software/firmware updates, or a combination thereof acting on the electronic system 100.

An embodiment of the control circuitry 138, coupled or connected to the secondary-actuator 132, the HAM 130, and the head 102, can reduce the risk of Head Disk Interaction (HDI) and does not affect normal or functional operations of the drive, such as read and write operations. Various embodiments of the control circuitry 138 include configuring the control circuitry 138 to limit slew rates of the secondary-actuator 132, such as a PZE actuator, to control the slew rate to reduce or eliminate a HDI event.

A disk activity error for the electronic system 100, such as a hard disk drive or tape drive or a hybrid drive, can result from a number of possible events. The disk activity error can include the HDI event, an event disrupting or inhibiting the head 102 from proper read or write of the data surface of the media 104, or a combination thereof.

The HDI event can be a self-excited vibration where the air bearing surface (ABS) fails to maintain a stable fly height and can contact a surface of the media 104 due to changes in the speed 107, temperature changes, pressure changes, uncompensated control of the secondary-actuator, or a combination thereof.

Because of increased track density and decreased operating head fly heights, the HDI becomes a dominant failure mode in hard disk drives. The HDI event could cause serious reliability issues such as rapid off-track write, media scratch, head damage, particle contaminants, or a combination thereof.

The self-excited vibration of the HDI can produce marginal track writes, due to over saturation or under saturation of magnetic flux onto the media as the head 102 fly height too high or too low, resulting in poor bit registration at read-back of the track from weak signals, corrupted signals, or a combination thereof.

The secondary-actuator 132, can be controlled by the control circuitry 138 to minimize or eliminate the disk activity error, such as the HDI events due flying dynamics changes by the HAM 130, the spindle motor 114, interior temperature or pressure of the electronic system 100, exterior influences to the electronic system 100, or a combination thereof. The exterior influences to the electronic system 100 can be, for example, influences such as temperature, pressure, impacts/movements, relative speed changes between the head 102 and the speed 107 of the media 104, or a combination thereof, to minimize or eliminate HDI events.

The control circuitry 138 can be coupled or connected to the HAM 130 by control signals of a HAM control 152. More details for controlling the HAM are discussed in FIG. 3. The secondary-actuator 132 can be coupled or connected to the control circuitry 138 and to the head 102 to provide control head flight stability and control fine movement of the head.

In an embodiment, the electronic system 100 further comprises the control circuitry 138 configured to execute the flow diagram of FIG. 1C. One embodiment can have the flow diagram representing a firmware or software implementation and executed by the control circuitry 138. In another embodiment, the flow diagram can be implemented as hardware or circuitry as part of the control circuitry 138. In yet another embodiment, the flow diagram can be a combination of firmware or software with hardware or circuitry as the control circuitry 138.

The flow diagram of FIG. 1C represents a method of operating the electronic system 100 in an embodiment. Block 144 shows flying a head over a media, which can represent the head 102 flying over a track of the media 104 and moving towards the track, moving away from the track, or a combination thereof.

Block 146 shows controlling a primary actuator and a secondary actuator for positioning the head, which can represent controlling the primary-actuator 122 and the secondary-actuator 132 coupled to the head 102, for positioning of the head 102.

Block 148 shows limiting a secondary actuator slew rate by control circuitry, which can represent the control circuitry 138 limiting a secondary-actuator slew rate 308 of FIG. 3 of the secondary-actuator 132 discussed in more detail later below.

For example, in another embodiment, the block 146 represents minimization or elimination of the HDI events by using the control circuitry 138 to control the secondary-actuator 132 using signals of the secondary-actuator control interface 150. In one embodiment, the control circuitry 138 controls or influences the flying characteristics of the head 102 based on analysis of the HDI event detected by the control circuitry 138.

The calculations performed by the control circuitry 138 can be based on an update frequency or a sampling period of the disk activity error detected by the control circuitry 138 and used to influence how often or a frequency of the signals of the secondary-actuator control interface 150 are to change. The calculations performed by the control circuitry 138 can be based on a duration of the disk activity error detected by the control circuitry 138 and used to determine how long or a duration of the signals of the secondary-actuator control interface 150 are applied to the secondary-actuator 132.

The calculations performed by the control circuitry 138 can be based on the magnitude of the disk activity error detected by the control circuitry 138 and used to determine a limit, such as a slew rate, or magnitude of the signals of the secondary-actuator control interface 150 for PZT actuator controls, as examples. A transitory change rate or a slew rate of the signals of the secondary-actuator control interface 150 can be based on a slew rate of the disk activity error detected by the control circuitry 138 and used to determine the transition time to change from one set of signals to another set of signals of the secondary-actuator control interface 150, for example.

Each one or a combination of the frequency, the duration, the limit, or the slew rate of the signals of the secondary-actuator control interface 150, applied and unchanged over a period of time can be defined as a control step of the secondary-actuator control interface 150. In an embodiment, a duration of the signals of the secondary-actuator control interface 150 refers to how long the signals of the secondary-actuator control interface 150 are statically driven or applied before the signals of the secondary-actuator control interface 150 are changed or re-applied. In another embodiment, a limit of the signals of the secondary-actuator control interface 150, refers to constraint applied to the signals of the secondary-actuator control interface 150, such as a voltage, current, charge constraint, or a constraint combination thereof, and can include a maximum value, a minimum value, or a value range.

In another embodiment, a frequency of the signals of the secondary-actuator control interface 150 refers to how often the secondary-actuator control interface 150 signals are changed or adjusted. In yet another embodiment, a slew rate of the signals of the secondary-actuator control interface 150 refers to the elapsed transition time to change a first of the signals of the secondary-actuator control interface 150, actively driven, to a second of the signals of the secondary-actuator control interface 150, to be driven. The first of the signals of the secondary-actuator control interface 150 can be identical or different from the second of the signals of the secondary-actuator control interface 150.

In yet another embodiment, a multi-combination of the signals of the secondary-actuator control interface 150 refers a two or more of the frequency, the duration, the limit, and the slew rate of the signals of the secondary-actuator control interface 150 are changed or adjusted. For example, in an embodiment having HDI events, the frequency, the duration, the limit, and the slew rate of the signals of the secondary-actuator control interface 150 could be an applied change or adjustment.

Additional details related to the FIGS. 1A-1C will be provided below in conjunction with the FIG. 2 and with other embodiments.

It has been discovered in an embodiment that calculations performed by the control circuitry 138 based on a sampling period of the disk activity error detected by the control circuitry 138 and used to influence the frequency of the signals of the secondary-actuator control interface 150 are changed substantially improves seek and read performance of the electronic system 100 and reduces the HDI events.

It has been discovered in an embodiment that control step adjustments to the secondary-actuator 132 by the control circuitry 138 improves the electronic system 100 performance by eliminating or reducing HDI events.

It has been discovered in an embodiment that calculations performed by the control circuitry 138 based on the duration of the disk activity error detected by the control circuitry 138 and used to determine the duration of signals of the secondary-actuator control interface 150 are applied to the secondary-actuator 132 reduces or eliminates the HDI events.

It has been discovered in an embodiment that by reducing the HDI and the impacts by the HDI using the control circuitry 138 to control the duration of the multi-combination of the signals of the secondary-actuator control interface 150, such as PZT magnitude and the PZT slew rate applied to the secondary-actuator 132, improves reliability.

It has been discovered in an embodiment of the control circuitry 138 controlling the multi-combination of the signals of the secondary-actuator control interface 150, such as the magnitude or limit of the signals of the secondary-actuator control interface 150 and the PZT control slew rate changes applied to the secondary-actuator 132 improves reliability by reducing the HDI and the impacts to the media from HDI events.

It has been discovered in an embodiment that calculations performed by the control circuitry 138 based on the magnitude of the disk activity error detected by the control circuitry 138 and used to determine the limit of the signals of the secondary-actuator control interface 150 improves the performance and response times for the correction or elimination of the HDI events.

It has been discovered in an embodiment that the control circuitry 138 controlling the PZT control duration and the PZT control frequency of which a change in the magnitude or limit of the signals of the secondary-actuator control interface 150 and the PZT control slew rate are applied to the secondary-actuator 132 improves reliability by reducing the HDI and the impacts by the HDI.

It has been discovered in an embodiment that calculations based on the slew rate of the disk activity error detected by the control circuitry 138 and used by the control circuitry 138 to determine the transition time to change from one set of the signals of the secondary-actuator control interface 150 to another set of the signals of the secondary-actuator control interface 150 improves the performance of read and write operations by optimizing the recovery of and saturation of transitions patterns between the head 102 and the media 104.

Referring now to FIG. 2, therein is shown block functions of portions of the control circuitry 138 detailing adjustment calculations used for controlling the secondary-actuator 132 according to one embodiment. FIG. 2 can represent an embodiment with detailed descriptions for the block 146 of FIG. 1C, the block 148 of FIG. 1C, and portions of the block 144 of FIG. 1C.

Inputs to FIG. 2 can be represented by a position reference 202 from servo circuitry (not shown) and servo/user data 204, track information from individual track positions/locations of the media 104 of FIGS. 1A-1B. The position reference 202 represents locations of the individual track positions/locations that are located between pairs of unique servo reference patterns on the media.

The position reference 202 can be derived from pattern differences between at least two of the unique servo reference pattern tracks next to one another with no other intervening servo reference pattern track. The position reference 202 can used to monitor the primary-actuator 122 of FIG. 1A and the head 102 of FIG. 1B relative to the individual track positions/locations of the media 104.

For example, repetitions of a group of four unique servo reference pattern tracks can be used to determine each of the individual track positions/locations along a radial arc shaped movement of head motion over the media 104, such as a head movement towards the inner diameter, movement away from the inner diameter of the media, flying over a specific track, crossing an odd numbered track, crossing an even numbered track, movement speed across multiple tracks of the media 104, or a combination thereof.

The servo/user data 204 can be used by a read channel 206 to generate an estimated position 208 of the head 102. The servo/user data 204 represents servo or user information, read from individual tracks by the read channel 206. The read channel 206 can process, for example, synchronize, filter, amplify, convert, decode, validate, or a combination thereof, the servo/user data 204 received from any individual track.

The read channel 206 can include circuitry, such as an analog, a digital, a filter, or a circuitry combination thereof, used to detect, receive, interpret, translate, or a combination thereof, to extract and generate the servo/user data 204 from a track of the media 104. The read channel 206 outputs the estimated position 208, for example, such as index mark, servo byte identifiers, servo bit sync fields, servo sync byte fields, servo identifier (SID) fields, user data, user data fields, encoded data, unique transition patterns, or a combination thereof for the individual tracks read by the read channel 206.

The estimated position 208 can, for example, also include track information read from a track or head sensor. The information can indicate head fly height variations, head vibrations, ABS air turbulence, or a combination thereof. The position reference 202 and the estimated position 208 signals can be used to generate a position error signal (PES) 210.

The PES 210 indicates an occurrence of an HDI event or a disk activity error to the control circuitry 138 of FIG. 1A and can be generated using the control circuitry 138 by comparing, adding, differentiating, or a combination thereof, between the position reference 202 and the estimated position 208 signals.

In one embodiment, the PES 210 signal is sent to the secondary-adjuster controller block ("SA controller") 214. The SA controller 214 analyzes the PES 210 signal and calculates or measures actual signature characteristics of the PES 210 signal. The actual signature characteristics can, for example, include an average amplitude, a peak amplitude, a duration, a slew rate, a frequency, or a combination of the actual signal characteristics of the PES 210 thereof. The actual signal characteristics are shown as signal characteristics 220.

Calculating or measuring of the signal characteristics 220, by the SA controller 214, can include processes such as filtering, comparing, integrating, differentiation, fast fourier transformations (FFT), convergence analysis, or a combination thereof. The convergence analysis, for example, can include characteristic testing and partial series analysis such partial sums of geometric series, divergence, integral, harmonic series, comparison, ratio, root, alternating series, or a combination thereof, as examples.

The SA controller 214 can output the signal characteristics 220 of the PES 210 to a magnitude and slew rate saturation block 216. The SA controller 214 can also record the PES 210 signal information in a log 217, for performance and reliability use such as predictive failure, warranty validation, maintenance scheduling, factory or field diagnosis, or a combination thereof.

In one embodiment, the magnitude and slew rate saturation block 216 evaluates the signal characteristics 220, to generate recommendations, feedback, or adjustment to signals for input to and processing by a secondary-actuator adjuster block 218. The magnitude and slew rate saturation block 216 can compare the signal characteristics 220 from the SA controller 214 against signal profiles available to the magnitude and slew rate saturation block 216, to determine if feedback or adjustment characteristics are needed. Although the signal profiles 224 are depicted in the magnitude and slew rate saturation block 216, it is understood the signal profiles 224 can be partitioned differently within the electronic system 100 of FIG. 1A.

For example, the signal profiles 224, used by the magnitude and slew rate saturation block 216, can be calculated or generated from within, calculated or generated from outside the magnitude and slew rate saturation block 216, or a combination thereof. In another example, the signal profiles 224 can be previously stored profiles available within, from outside the magnitude and slew rate saturation block 216, or a combination thereof.

The magnitude and slew rate saturation block 216 can calculate or generate the saturation slew rate maximum and the saturation control voltage magnitude maximum using one of several methods chosen based on the signal characteristics 220 received from the SA controller 214 and the signal profiles 224. The signal profiles 224, for example, can be categorized by the magnitude and slew rate saturation block 216 into different profile types such as an impulse, a single burst, a multiple burst, a saturated burst, or a combination thereof.

In an embodiment, for example, the signal characteristics 220 representing the PES 210 matching the signal profiles 224 of an impulse with peak voltage amplitude, such as below five percent of the PES 210 maximum voltage amplitude threshold, could result in the SA adjuster 218 receiving no correction information on a head actuation motor (HAM) feedback 226 from the magnitude and slew rate saturation block 216. The no correction information is sent on the HAM feedback 226, resulting in no adjustments or changes sent from the SA adjuster 218 to the secondary-actuator 132 for a HDI event.

In another embodiment for example, the signal characteristics 220 representing the PES 210 matching the signal profiles 224, of a saturated burst with a peak PZT voltage amplitude greater than eighty percent of a maximum voltage amplitude threshold of the PES 210, could trigger the magnitude and slew rate saturation block 216 to calculate or generate correction information of a saturation slew rate maximum and a saturation control voltage magnitude maximum as outputs on the HAM feedback 226 to the SA adjuster 218 to correct or compensate the HDI event based on the PES 210.

The correction information can include scalar parameters 228. The scalar parameters 228 can be generated by the magnitude and slew rate saturation block 216 to provide recommended scaling or multiplier factors to be applied to the control signals that are to be adjusted by the SA adjuster 218 and sent out on a HAM loop 230 interface. For example, the scalar parameters 228 can be scaling factors based on the signal characteristics 220 of the PES 210 used to scale up or down signals of the HAM feedback 226, by adjusting slew rates, saturation control magnitudes, any other of the signals, or a combination of signals thereof, sent on the HAM loop 230 interface by the SA adjuster 218.

The SA adjuster 218, receiving correction information from the HAM feedback 226, can process the correction information and send adjustments on the HAM loop 230. The HAM loop 230 interface, includes individual control signals to the secondary-actuator 132 of FIG. 1B, the spindle motor 114 of FIG. 1A, and the HAM 130 of FIG. 1A to adjust the head 102 with the secondary-actuator control interface 150 signals, adjust the spindle motor interface (not shown) to vary the speed 107 of the media 104, and adjust the control signals of the HAM control 152 to position and control movements of the primary-actuator 122 across the media 104, respectively.

The SA adjuster 218 receives the HAM feedback 226 to process, evaluate, generate, or a combination thereof any corrective adjustments to the individual control signals of the HAM loop 230 interface. The processing by the SA adjuster 218 can include filtering, sampling, averaging, signal curve or trend characterizations, or a combination thereof of the HDI event information received from the HAM feedback 226.

The SA adjuster 218 can be evaluating the processed information to determine whether or not a correction adjustment is needed, where individual control signals are to be corrected, and what intensity or magnitude level of correction is needed to the individual control signals. For example, excessive intensity levels of HDI events occurring as the head 102 is stationary over tracks near the outer diameter could be corrected by adjusting the spindle motor 114 to reduce the speed 107 of the media thru the motor interface (not shown) of the HAM loop 230 interface. The SA adjuster 218 also includes parameters or the secondary-actuator controls 141, calculated by the SA controller 214 for adjusting the head 102 within a localized range or track on the media 104.

The SA adjuster 218 maintains a local record of a control step duration 232, a control step limit 234, a control step frequency 236, a control step slew rate 238, and a control step multi-combination 239, are parameter records corresponding to the duration of the signals of the secondary-actuator control interface 150, the limit of the signals of the secondary-actuator control interface 150, the frequency of the signals of the secondary-actuator control interface 150, the slew rate of the signals of the secondary-actuator control interface 150, and the multi-combination of the signals of the secondary-actuator control interface 150, respectively. The control step duration 232, the control step limit 234, the control step frequency 236, and the control step slew rate 238, and the control step multi-combination 239 can be used to provide reliability information to the control circuitry 138 based on adjustment histories performed by the SA adjuster 218 on the HAM loop 230.

In another example, if the head 102 is moving from the inner diameter to the outer diameter with moderate intensity levels of HDI events could be corrected by adjusting the control signals of the HAM control 152 of the HAM loop 230 interface to control the acceleration, coasting, and deceleration of the primary-actuator 122. In yet another example, if the head 102 is having small intensity levels of HDI events, such as millimeter deviations from a track center, the SA adjuster 218 could apply milli-corrections to the secondary-actuator 132 using the secondary-actuator control interface 150 signals of the HAM loop 230 interface.

In an embodiment, the SA adjuster 218 can generate the secondary-actuator control interface 150 signals on the HAM loop 230 interface to eliminate or minimize HDI as-well-as for read operations, write operations, power-up, power-down, diagnostic operations, normal disk drive operations, or a combination thereof.

The SA adjuster 218, the magnitude and slew rate saturation block 216, or a combination thereof, can be used to determine the PZT control slew rate defined by the expression: $(u(k)-u(k-1))/Ts$, where $u(k)$ is the PZT control effort at the sample k and Ts is the sampling time. In one embodiment, slew rate saturation is to saturate $|(u(k)-u(k-1))/Ts|$ to a pre-defined slew rate limit.

It is understood that the functional partitioning between the SA adjuster 218 and the magnitude and slew rate saturation block 216 can be different. For example, the magnitude and slew rate saturation block 216 could incorporate functions for the SA adjuster 218 resulting in the magnitude saturation and slew rate saturation controls signals transmitted to the SA adjuster 218 on the HAM feedback 226 and combined into the HAM loop 230 interface by the SA adjuster 218.

Logic expressions representative of some operations performed by the SA adjuster 218, the magnitude and slew rate saturation block 216, or a combination thereof, for example, can include:

saturate($u(k)$,PZT_control_magnitude_limit); (saturate the control magnitude)

delta=$u(k)-u(k-1)$; (calculate the control slew rate)

saturate(delta,PZT_control_slew_rate_limit); (saturate the control slew rate)

or $u(k)=u(k-1)$+delta;

Saturation of both magnitude and slew rate of $u(k)$ are the resultant of the logic expressions. According to one or more embodiments, the pre-defined slew rate limit is usually determined through measuring the slider corner roll amplitude with PZT control command at different slew rates.

The slider corner roll amplitude can be defined as maximum vertical distance changes of a point on a perimeter edge of a head flying over a media due to aerodynamics of the flying head, such as of roll, turbulence, or forces between the head, media surface, and air density between the head and media surface, for example. The logic in FIG. 2 can be implemented as part of a firmware control for the electronic system 100, part of a hardware-implemented logic circuit, or a combination of both.

FIG. 2 also shows an auto-calibration block function shown with dash-dot lines ("autocal 242"). The auto-calibration block 242 of the control circuitry 138 can be used to perform power-on self-test, self-calibration, failure detection, evaluation, or a combination thereof of the electronic system 100. The auto-calibration block 242 can include a shadow magnitude and slew rate saturation block 244.

The shadow magnitude and slew rate saturation block 244 can include shadow signal profiles 246 and shadow scalar parameters 248. The shadow magnitude and slew rate saturation block 244, the shadow signal profiles 246, and the shadow scalar parameters 248 can be functionally similar to the magnitude and slew rate saturation block 216, the signal profiles 224, and the scalar parameters 228, respectively.

The auto-calibration block 242 can also include a digital-to-analog converter 250, a bias offset 252 and the HAM feedback 226 as signal inputs, and a secondary-actuator control output ("SA control output") 254 as a signal output. The SA control output 254 can be accessed internal to or externally from the electronic system 100 and there are access points (not shown) throughout the auto-calibration block 242 used by the control circuitry 138 to self-test and self-calibrate the SA controller 214, the magnitude and slew rate saturation block 216, and the SA adjuster 218 of the control circuitry 138. The SA control output 254, the HAM loop 230 interface signals, or a combination thereof, can also provide for stepping down, clamping, limiting, or shutting down of the secondary-actuator control interface 150 signals to the secondary-actuator 132 on power-down, head loading, or power loss events by exponential decay.

The control circuitry 138 can be configured to adapt a limit of the secondary-actuator slew rate 308 of the secondary-actuator 132 during a calibration procedure when the bias offset 252 provides a predetermined signal 253, such as a calibration signal. The concepts of the slew rates of the secondary-actuator 132 and exponential decay are further described in FIG. 3 and FIG. 4.

In an embodiment, the bias offset 252 can be used to increase, decrease, or null-out the signals of the HAM feedback 226 received from the PES 210 using an adder 256. For example, if the PES 210 signal is zero, such as an absence of any HDI event, the bias offset 252 can be driven with a voltage, current, or charge to replicate or simulate a specific signal characteristic of or HDI event. This could be used, for example, as a method to create the shadow signal profiles 246 entries which can be used to modify or replace an entry in the signal profiles 224.

In another embodiment, the bias offset 252 can be used to test, create, predict, and fine-tune the scalar parameters 228 parameters specific to each unique manufactured or operational life phase of the electronic system 100, in a manner similar to the shadow signal profiles 246. For example, the scalar parameters 228 can be fine-tuned to different values after ten thousand hours of operation compared to after only one hundred hours of operation.

It has been discovered the control circuitry 138 configured to connect the shadow magnitude and slew rate saturation block 244 with the shadow signal profiles 246, and the shadow scalar parameters 248 in tandem with the magnitude and slew rate saturation block 216 with the signal profiles 224, and the scalar parameters 228, respectively, provides the SA controller 214 with significantly increased bandwidths to process, analyze, adjust, and control any HDI event of any duration through parallel processing of the PES 210 derived information to provide superior performance and reliability for the electronic system 100.

It has been discovered the control circuitry 138 configured to connect the shadow magnitude and slew rate saturation block 244 with the shadow signal profiles 246, and the shadow scalar parameters 248 as backup to the magnitude and slew rate saturation block 216 with the signal profiles 224, and the scalar parameters 228, respectively, provides the SA controller 214 with redundancy and cross-checking capabilities to improve reliability and availability of the electronic system 100.

Figure 3:
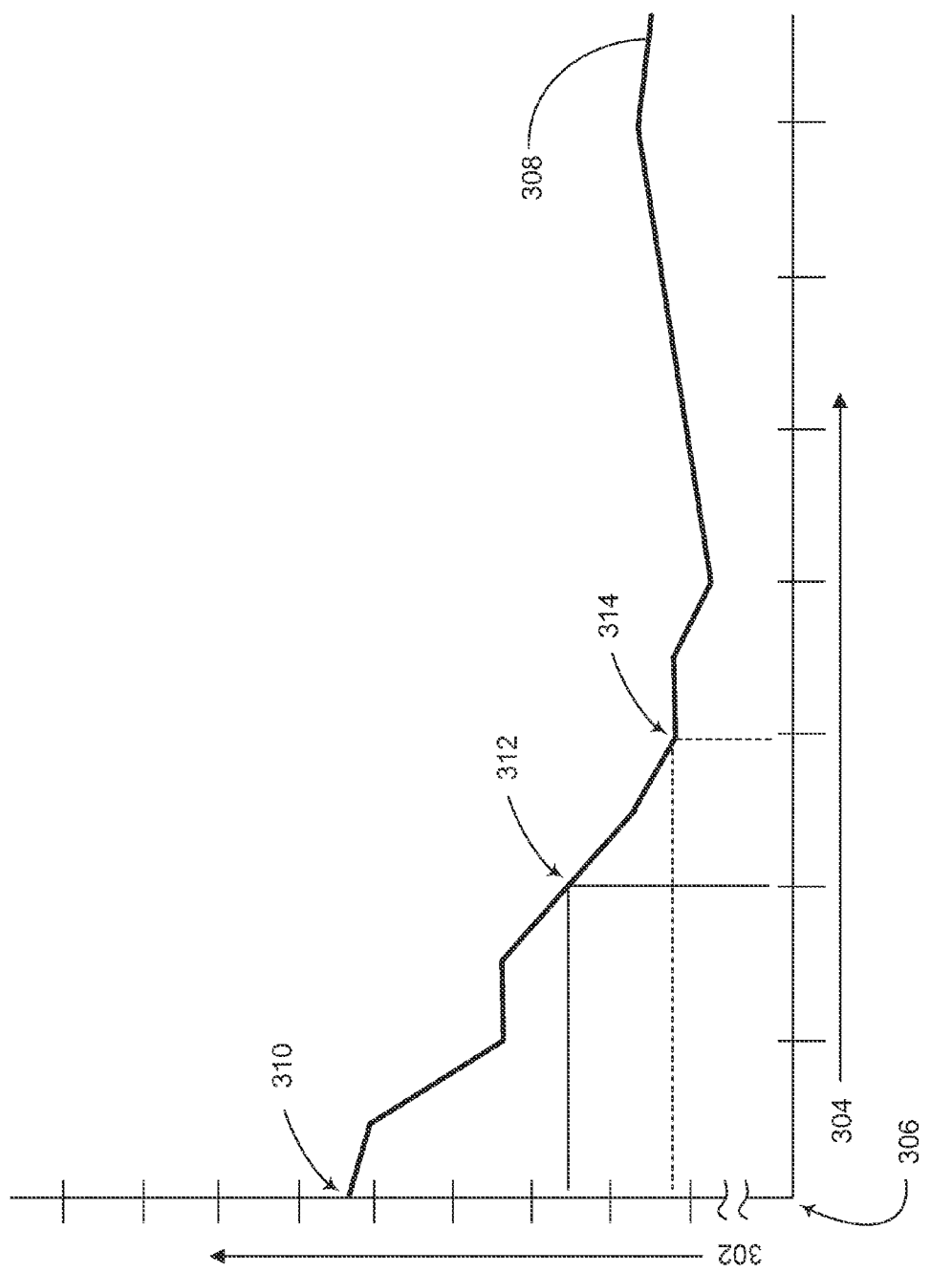
FIG. 3 shows a plot of head roll versus secondary-actuator control slew rate according to one embodiment.

Referring now to FIG. 3, therein is shown a plot of head roll versus secondary-actuator control slew rate according to one embodiment. FIG. 3 depicts an example of variations of slew rate as embodiments described in FIG. 1C and FIG. 2. As noted in FIG. 2, the pre-defined slew rate limit can be determined through measuring the slider corner roll amplitude with PZT control command at different slew rates.

A vertical axis of corner roll maximum amplitude 302, indicates head roll amplitude maximums in increasing units of nanometers (nm). A horizontal axis of stepped slew rate 304, indicates the secondary-actuator slew rate 308 of the secondary-actuator 132 of control signals to limit the slew rate of the secondary actuator 132, in increasing magnitude units of volts per step from an origin 306 located at zero units vertical and zero units horizontal of the plot.

The plot depicts the corner roll changes from slew rates varied as a result of stepped changes of the sa_control signals, such as the secondary-actuator control interface 150 of FIGS. 1A-2 having voltage excursions from zero to a pre-determined maximum voltage ($V_{max}$) selected or specified by the user or manufacturer for the secondary-actuator 132 of FIG. 1B.

The maximum amplitude of the corner roll increases as plotted points on the secondary-actuator slew rate 308 move vertically away from the horizontal axis. Also, as points on the secondary-actuator slew rate 308 move horizontally away from the vertical axis, the slew rate of the sa_control signals increase in magnitude, indicating a slower slew rate or transitions from more control steps, such as more time for the sa_control signals to transition or step from one control setting to another as described in FIG. 1C.

An area 310 of the plot shows the secondary-actuator 132 with no control circuitry configured to limit, adjust, or compensate control steps of control signals such step slew rate, magnitude, duration, frequency, or any combination thereof. The sa_control signals are driven from zero to $V_{max}$. The area 310 shows the greatest amplitudes of corner roll head movement and indicates poor flying stability which can result in dangerous HDI and HDI events and from over 0.55 nm of corner roll.

Area 312 of the plot shows the secondary-actuator 132 with the control circuitry 138 of FIG. 2 configured to control steps of the control signals to limit the slew by progressively adjusting the control signals in steps resulting in a slowed or dampened slew rate. The area 312 shows a reduction in the greatest amplitude of corner roll over of the area 310 and can be approximately 0.43 nm of corner roll, providing no or low probability of any HDI or HDI events.

Area 314 of the plot shows the secondary-actuator 132 with the control circuitry 138 configured to control steps of the control signals further, such as twenty five percent more steps over the steps applied to the area 312, to limit the slew by further progressively adjusting the control signals in further steps resulting in less than 0.38 nm of corner roll, to eliminate any HDI or HDI events from occurring.

It has been discovered that the control circuitry 138 configured to limit, adjust, and compensate step slew rate, magnitude, duration, and frequency provides the capability to select an optimized profile to minimize corner roll and maximize performance for any particular seek profile.

Figure 4:
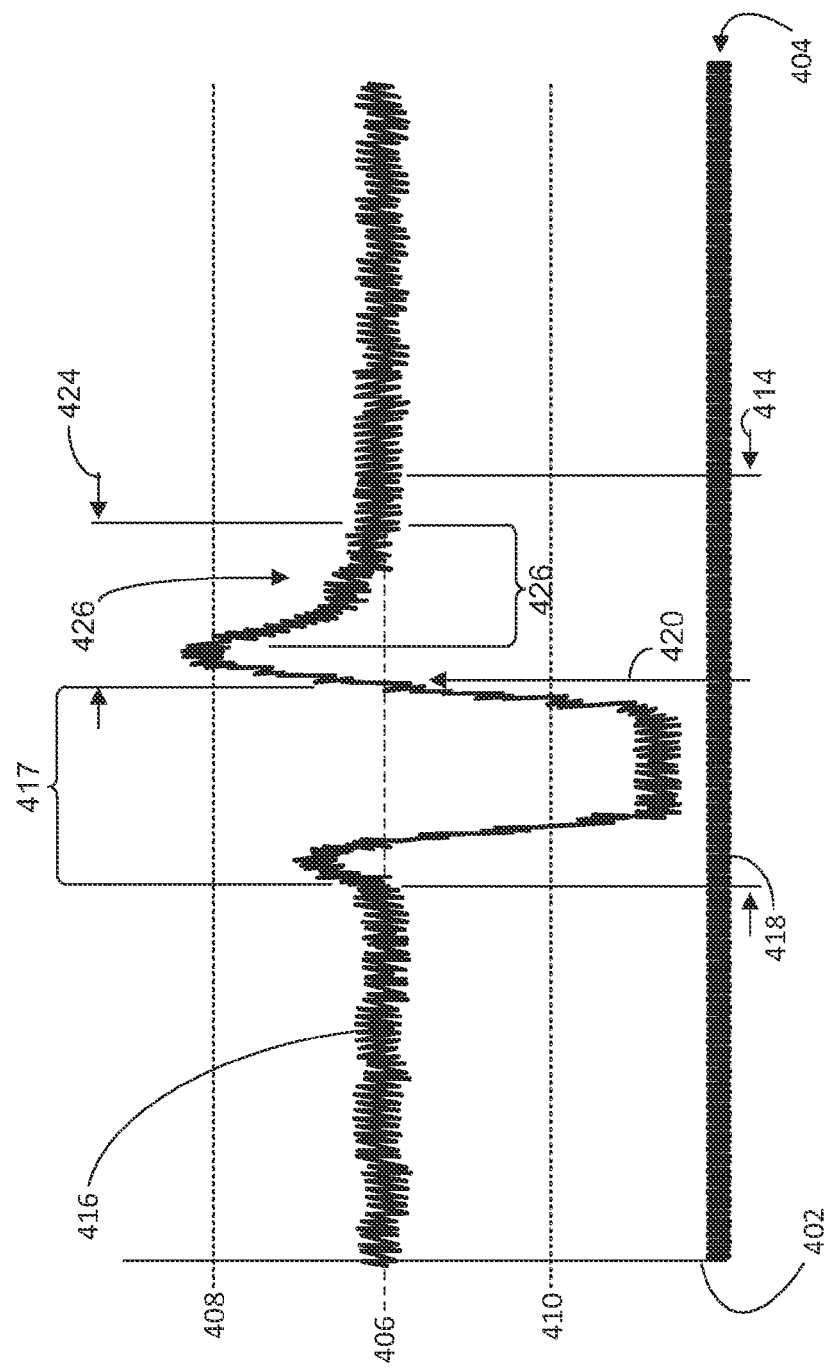
FIG. 4 shows a slew rate limit and exponential decay feature according to one embodiment.

Referring now to FIG. 4, therein is graphically shown a slew rate limit and exponential decay feature according to one embodiment. A vertical axis labeled and representing energy levels 402, such as a voltage, current, or charge level, is shown intersecting with a horizontal axis labeled and representing control of each secondary-actuator step per sample period 404, used to represent consecutive sample identifiers for each of the energy levels 402 recorded from the secondary-actuator control interface 150 of FIG. 1A signals from the HAM loop 230 of FIG. 2 interface to the secondary-actuator 132 of FIG. 1C.

A zero magnitude 406 level is shown between a positive level 408 and a negative level 410 and can represent zero volts, positive twenty volts, and negative twenty volts, respectively for example. Sample window 414 shows a period of samples during an HDI event occurrence, such as external vibrations, sudden pressure changes, or similar HDI activity.

Also an energy waveform 416 is shown before, during, and after the sample window 414. The sample window 414 is shown with a sub-window 417 identifying a portion of the sample window 414 while the HAM loop 230 interface signals are adjusting and compensating for the HDI event. The control circuitry 138 is configured to limit each of the energy levels 402 of the secondary-actuator step per sample period 404 of horizontal axis. A first step data point followed by second step data point adjacent step data points 418.

A power-down event occurs at sample 420 of each of the secondary-actuator step per sample period 404, triggering the auto-calibration block 242 of FIG. 2 to interact with the SA adjuster 218 of FIG. 2 to generate a forward feed of energy to adjust steps of the secondary-actuator control interface 150 signals to exponentially decaying the energy to provide a smooth damped shutdown of the secondary-actuator 132 PZT in a secondary-actuator control step 424. A decay function 426 defines an exponential decay ramp down portion of the sample window 414 to limit the secondary-actuator slew rate 308 by reducing a size of the secondary-actuator control step 424.

It has been discovered that the auto-calibration block 242 in conjunction with the SA adjuster 218 and the SA controller 214 prevents HDI events from occurring by providing a compensated landing profile for the head 102 parking the head 102 on power-downs resulting in elimination of HDI damage.

Figure 5:
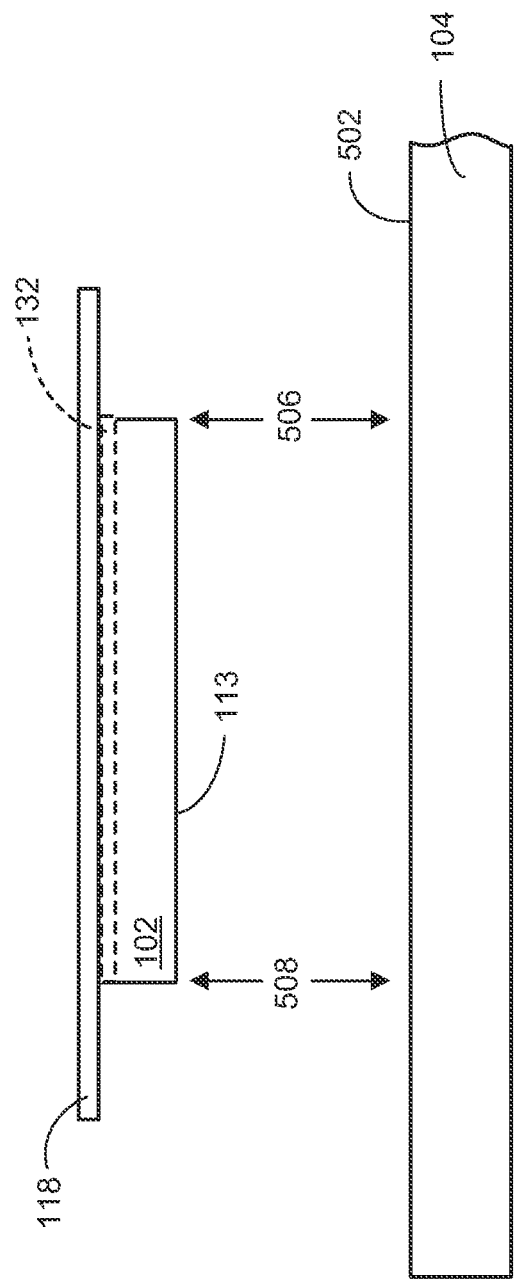
FIG. 5 shows a side view of the head illustrating out of plane motion according to one embodiment.

Referring now to FIG. 5, therein is shown a side view of the head 102 illustrating out of plane motion according to one embodiment. Shown is a side view of an end of the head 102 facing away from the bearing assembly 126 of FIG. 1A flying over a media data surface 502 of the media 104. The head active surface 113, of the head 102, parallel to the media data surface 502 directly facing the head active surface 113 and flying in a single plane over the media 104 is defined to be flying in a plane motion.

While the head active surface 113 of the head 102 is flying in the plane of motion, opposite edges of the head 102 parallel with a central longitudinal axis of the primary-actuator 122 of FIG. 1A have vertical distances of D1 506 and D2 508, respectively. The vertical distances of the D1 506 and the D2 508 are equivalent or substantially equivalent to one another as long as the head active surface 113 flies in the plane of motion.

The head 102 is flying out of plane motion anytime the head active surface 113 transitions or exits out of the plane motion while flying. An out of plane motion of the head 102 also results in the D1 506 vertical distance becoming different from the D2 508 vertical distance. Any out of plane motion of the head 102 generates non-perpendicular forces that create unbalanced drag and lift forces acting on the head active surface 113 that can result in a self-inflicted or intrinsic HDI event, such as the head 102 contacting the media 104.

It has been discovered that the control circuitry 138 of FIG. 2 having a combination of the SA controller 214 of FIG. 2, the magnitude and slew rate saturation block 216 of FIG. 2, the SA adjuster 218 of FIG. 2, and both the shadow magnitude and slew rate saturation 244 of FIG. 2 of the auto-calibration block 242 of FIG. 2, eliminates or reduces the occurrence of unpredictable out of plane motion of the head 102, HDI events, intrinsic HDI events, or a combination thereof by generating and applying control steps to the secondary-actuator control interface 150 signals of FIG. 1A connected to the secondary-actuator 132 of FIG. 1B.

Figure 6:
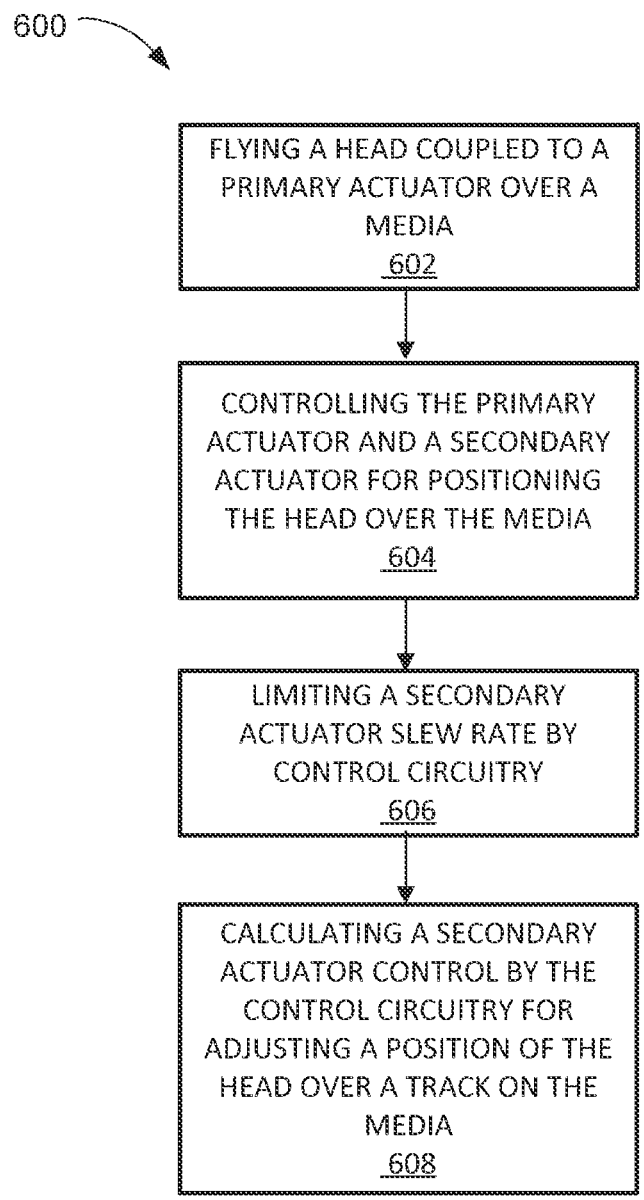
FIG. 6 shows a flow chart of the control circuitry positioning the head over a track of the media of an electronic system according to one embodiment.

Referring now to FIG. 6, therein is shown a flow chart of the control circuitry 138 of FIGS. 1A and 2 positioning the head 102 of FIG. 1B over a track of the media 104 of FIG. 1A of an electronic system 600 according to one embodiment. Block 602 represents the head 102, flying over the media 104, coupled to the primary-actuator 122 of FIG. 1A and under control of the HAM 130 of FIG. 1A with no HDI event activities.

Block 604 represents the control circuitry 138 controlling the HAM 130 and the speed 107 of FIG. 1A of the spindle motor 114 of FIG. 1A to maintain the control for flying the head 102 over a targeted data track of the media 104. Block 606 represents an HDI event detected from the PES 210 of FIG. 2 by the SA controller 214 of FIG. 2 in the control circuitry 138 resulting in the control circuitry 138 actively driving the secondary-actuator control interface 150 of FIG. 1A through the HAM loop 230 of FIG. 2 with corrective signals and adjustments to the speed 107 of the spindle motor 114, the HAM 130 to control the primary-actuator 122, and the secondary-actuator control interface 150 to limit the secondary-actuator slew rate 308 of FIG. 3 based on information and parameters supplied by the magnitude and slew rate saturation block 216 of FIG. 2.

The corrective signals sent on the secondary-actuator control interface 150, delivered from the HAM_loop 230 are sent to adjust the position of the secondary-actuator 132 of FIG. 1B, a PZT device, directly attached between the head 102 and the primary-actuator 122. Block 608 represents the adjusting of the secondary-actuator 132 by the control circuitry 138 to orient the head active surface 113 of FIG. 5 of the head 102 to fly in a in plane motion and with the head 102 adjusted in a position over the targeted data track of the media 104 that is stable, parallel to the media data surface 502 of FIG. 5 of the media 104, and immune to any unpredictable out of plane motion of the head 102 due to the HDI event.

Another important aspect of an embodiment is that it valuably supports and services the historical trend of reducing costs, simplifying systems, and increasing performance. These and other valuable aspects of an embodiment consequently further the state of the technology to at least the next level.

While the embodiment has been described in conjunction with a specific events, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An apparatus comprising:
    a media;
    a head over the media; and
    a primary-actuator coupled to the head; and
    control circuitry, coupled to the primary-actuator and a secondary-actuator, configured to limit a secondary-actuator control slew rate based at least in part on a delta calculation of data from two sample periods.

2. The apparatus as claimed in claim 1 wherein the control circuitry is further configured to limit a secondary-actuator step per sample period.

3. The apparatus as claimed in claim 1 wherein the control circuitry comprises a magnitude and slew rate saturation block.

4. The apparatus as claimed in claim 1 wherein the control circuitry is further configured to calculate a secondary-actuator control for adjusting a position of the head within a localized range on the media.

5. The apparatus as claimed in claim 1 wherein the control circuitry is further configured to scale a head actuation motor feedback based on a position error signal.

6. The apparatus as claimed in claim 1 wherein the control circuitry is further configured to calculate a position error signal from an estimated position and a reference position.

7. The apparatus as claimed in claim 1 wherein the control circuitry is further configured to generate a secondary-actuator control output to self-calibrate the control circuitry.

8. The apparatus as claimed in claim 1 wherein the control circuitry is further configured to limit the secondary-actuator slew rate by reducing a secondary-actuator control step through a decay function, initialization of the secondary-actuator, and power-down of the secondary-actuator.

9. The apparatus as claimed in claim 1 wherein the control circuitry further comprises a shadow magnitude and slew rate saturation block configured to reduce an unpredictable out of plane motion of the head.

10. The apparatus as claimed in claim 1 wherein the control circuitry is further configured to adapt the limit of the secondary-actuator slew rate for a calibration procedure with a predetermined signal of a bias offset.

11. The apparatus as claimed in claim 1 wherein the control circuitry further comprises a secondary-actuator adjuster configured to limit a control step slew rate on a secondary-actuator control interface to limit a head-disk-interaction (HDI).

12. A method operating an apparatus, the method comprising:
    flying a head over a media;
    controlling a primary-actuator and a secondary-actuator for positioning the head over the media; and
    limiting a secondary-actuator control slew rate by control circuitry based at least in part on a delta calculation of data from two sample periods.

13. The method as claimed in claim 12 further comprising limiting a secondary-actuator step per sample period by the control circuitry.

14. The method as claimed in claim 12 wherein the control circuitry comprises a magnitude and slew rate saturation block.

15. The method as claimed in claim 12 further comprising calculating a secondary-actuator control, by the control circuitry, for adjusting a position of the head within a localized range on the media.

16. The method as claimed in claim 12 further comprising scaling a head actuation motor feedback, by the control circuitry, based on a position error signal.

17. The method as claimed in claim 12 further comprising calculating a position error signal, by the control circuitry, from an estimated position and a reference position.

18. The method as claimed in claim 12 further comprising generating a secondary-actuator output, by the control circuitry, to self-calibrate the control circuitry.

19. The method as claimed in claim 12 wherein limiting the secondary-actuator slew rate includes reducing a secondary-actuator control step through a decay function, initialization of the secondary-actuator, and power-down of the secondary-actuator.

20. The method as claimed in claim 12 further comprising a shadow magnitude and slew rate saturation block configured, by the control circuitry, to reduce an unpredictable out of plane motion of the head.

21. The method as claimed in claim 12 further comprising adapting the limit of the secondary-actuator slew rate for a calibration procedure, by the control circuitry, with a predetermined signal of a bias offset.

22. The method as claimed in claim 12 wherein limiting the secondary-actuator control slew rate includes comparing a control step slew rate to a predefined slew rate limit for limiting a control step slew rate on a secondary-actuator control interface to limit a head-disk-interaction (HDI).

\* \* \* \* \*